United States Patent [19]

Kim

[11] Patent Number: 5,193,943
[45] Date of Patent: Mar. 16, 1993

[54] CUTTING TOOL FOR USE IN A MILLING MACHINE

[75] Inventor: Jin Ki Kim, Ulsan, Rep. of Korea

[73] Assignee: Hyundai Motor Co., Seoul, Rep. of Korea

[21] Appl. No.: 831,950

[22] Filed: Feb. 6, 1992

[51] Int. Cl.⁵ .............................................. B23C 5/18
[52] U.S. Cl. ........................................ 407/42; 407/54
[58] Field of Search .................. 407/34, 42, 53, 54, 407/61, 62, 118; 408/199, 227, 229, 144, 145

[56] References Cited

U.S. PATENT DOCUMENTS

| | | | |
|---|---|---|---|
| 3,409,965 | 11/1968 | Fisher | 408/227 X |
| 4,470,733 | 9/1984 | Marques, Jr. | 408/230 |
| 4,525,110 | 6/1985 | Stojanovski | 407/40 |
| 4,527,930 | 7/1985 | Harroun | 407/42 |

FOREIGN PATENT DOCUMENTS

| | | | |
|---|---|---|---|
| 65149 | 11/1982 | European Pat. Off. | 407/54 |
| 1572767 | 6/1990 | U.S.S.R. | 407/54 |

*Primary Examiner*—Steven C. Bishop
*Attorney, Agent, or Firm*—Birch, Stewart, Kolasch & Birch

[57] ABSTRACT

A cutting tool for use in a milling machine, which includes a one unit tip having a pair of cutting edges, a center point of the pair of cutting edges having an inclined angle of 35°–45°, and the pair of cutting edges having an inclined angle of 6°–8° for reducing cutting stresses, improving cutting efficiency, and extending the life span of the cutting tool.

3 Claims, 2 Drawing Sheets

CUTTING TOOL FOR USE IN A MILLING MACHINE

BACKGROUND OF THE INVENTION

1. Field of the Invention

The present invention relates to a cutting tool for use in a milling machine and more particularly, to a ball nose end cutting tool particularly adapted for a copy milling machine, which includes one unit of a cutting bit having a pair of cutting edges disposed in a diagonal line with respect to each other for minimizing cutting stresses being applied to the cutting bit and extending the life span of the cutting tool.

2. Description of the Prior Art

Various types of cutting tools are known in the art. Such prior art cutting tools for use in milling machines can be classified in two categories. One category includes a pair of radial cutting edges fixed to a body made of a strong harness material, by welding with silver and lead as shown in U.S. Pat. No. 4,470,733 to Marques, Jr., and the other category includes a pair of tips fixed to a body by screws as shown in U.S. Pat. No. 4,525,110 to Stojanovski and U.S. Pat. No. 4,527,930 to Harroun.

However, these cutting tools suffer from a number of problems such as, for example, (1) since two tips are connected to each other and the gap formed between both tips is welded by silver, sometimes there is no cutting edge disposed on the center point portion of the cutting tool; (2) since the center point portion of the cutting tool as described above is subjected to cutting stresses and vibration during operation thereof, the welded portion can easily be cracked; (3) since bolts are used for fixing the tips to the body, a space can form between the tips and the body such that the bolts can become loosened during operation thereof, and the cutting edge does not retain its exact ball-shaped configuration; and (4) since the prior art cutting tools exhibit the above problems, they have a short life span.

SUMMARY OF THE INVENTION

Accordingly, it is an object of the present invention to provide an improved cutting tool for use in a milling machine, which eliminates the above problems encountered in a conventional cutting tool.

Another object of the present invention is to provide a cutting tool particularly adapted for a copy mill machine, which includes one unit of a tip having a pair of cutting edges disposed in a diagonal line with respect to each other, wherein a center point of the pair of cutting edges has an inclined angle of about 35°–45° for effectively improving cutting efficiency.

A further object of the present invention is to provide a ball nose end cutting tool for use in a milling machine, which includes a pair of cutting edges in a composite structure, the pair of cutting edges having an inclined angle of about 6°–8° for reducing cutting stresses being applied to the cutting edges and extending the life span of the cutting tool.

Yet another object of the present invention is to provide a cutting tool particularly adapted for a copy milling machine, which is simple in construction, compact for portability, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a cutting tool for use in a machine tool, which includes a one unit tip having a pair of cutting edges, a center point of the pair of cutting edges having an inclined angle of about 35°–45°, and the pair of cutting edges having an inclined angle of about 6°–8° for reducing cutting stresses, improving cutting efficiency, and extending life span of the cutting tool.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring now in detail to the drawings for the purpose of illustrating preferred embodiments of the present invention, the cutting tool for use in a milling machine as shown in FIGS. 1, 2a, 2b, and 3, includes an elongated body 20, a tapered mid-section 20', and a cap 20' including a cutting bit or a tip member 10 disposed in the cap 20'' of the end of the cutting tool.

Figure 1:
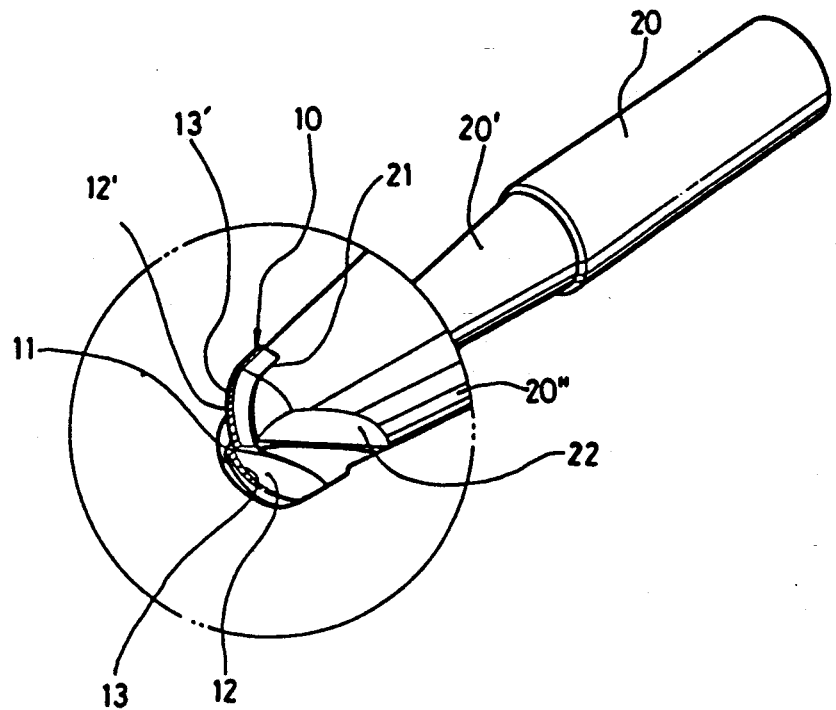
FIG. 1 is a perspective view of the cutting tool of the present invention containing an enlarged detail view of a tip area of the cutting tool.
Figure 3:
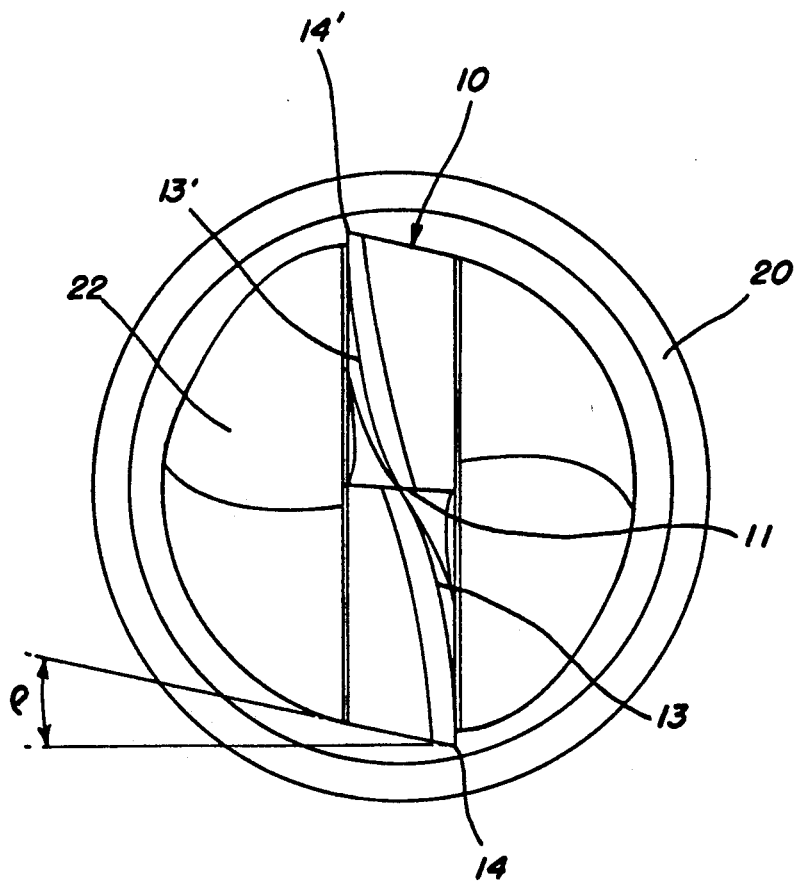
FIG. 3 is an enlarged top plan view of the tip area of the cutting tool of the present invention.
Figure 4:
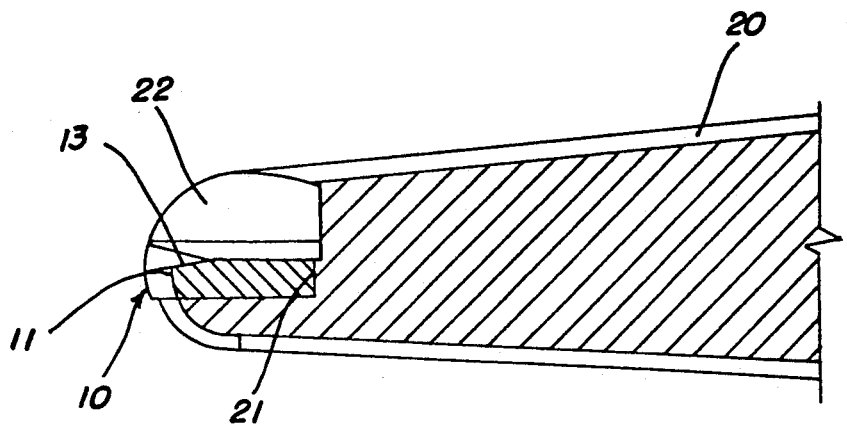
FIG. 4 is a sectional view of FIG. 3.

As shown in FIGS. 1 and 3, the cap 20'' includes a tip fixing groove 21 by welding the tip member 10 thereto with silver, and a pair of chip outlet areas 22 disposed between the tip member 10 in a diagonal line with respect to each other. The tip member 10 having a semicircle configuration, includes a pair of cutting edges 13 and 13' wherein the pair of cutting edges 13 and 13' form one surface of the pair of cutting edges 13 and 13'.

Figure 2A:
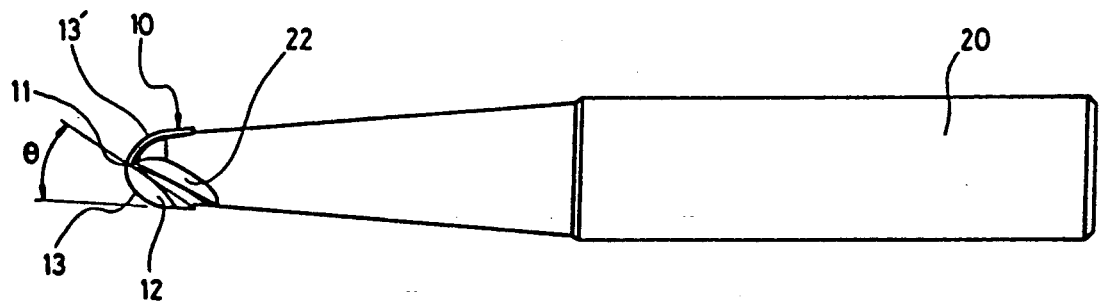
FIG. 2a is a front elevational view of the cutting tool of the present invention.
Figure 2B:
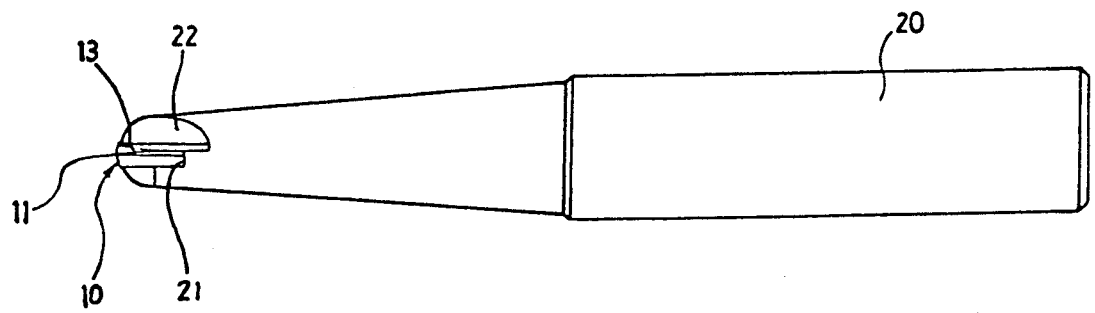
FIG. 2b is a bottom plan view of the cutting tool of the present invention.

As shown in FIGS. 2a, 2b, and 3, an inclined angle Θ of about 35°–45° with respect to an outer peripheral edge of the tipmember 10 is disposed at both sides with respect to a cardinal point of the center point 11 (FIG. 2a). The tip fixing groove 21 is provided with a pair of chip guiding slots 12 and 12' for exactly receiving the pair of cutting edges 13 and 13' in a diagonal line with respect to each other (FIGS. 1 and 3). Also, each of a pair of sharp edge points 14 of the tip member 10 has an inclined angle p of about 6°–8° with respect to a longitudinal axis of the elongated body, for avoiding interference from the object being cut (FIG. 3).

As shown in FIG. 2a, if the inclined angle Θ is less than 35°, the tip guiding slots 12 and 12' extending from the center point 11 have an elongated configuration, respectively. Therefore, a peripheral edge of the tip member 10 is not properly balanced, and the cutting tool can overcut so that the cut edges 13 and 13' are weak, and chips produced from the cutting operation can fly at the worker.

On the other hand, if the inclined angle Θ is more than 45°, the chip guiding slots 12 and 12' become very short. Therefore, the cutting tool cannot cut exactly along a round face of the object and chips produced from the cutting operation are cut again so that the cutting efficiency is decreased. Accordingly, the inclined angle Θ is about 35°–45°, preferably 40°.

As shown in FIG. 3, if the inclined angle p is less than 6° with respect to a longitudinal axis of the elongated body (FIG. 3), the object being cut can interfere with the cutting operation and cutting stresses are created during the operation so that heat is generated on the tip member 10 and the object. Therefore, the object may twist or transform.

On the other hand, when the inclined angle $p$ is more than 8°, although the cutting efficiency is good, correspondingly the peripheral edge of the cutting edges 13 and 13' of the tip member 10 becomes weak. Therefore, the cutting edges 13 and 13' are easily destroyed, noise pollution is generated and the cut surface of the object is not refined but crude. Accordingly, the inclined angle p is about 6°–8°, preferably 7°.

Thus, the cutting tool of the present invention includes the composite tip 10, the pair of cutting edges 13 and 13' disposed in a diagonal line with respect to each other, the center point 11 having the inclined angle Θ of about 35°–45° disposed on the center of the pair of cutting edges 13 and 13' and a pair of sharp edge points having the inclined angle $p$ of about 6°–8°, whereby the cutting tool can reduce cutting stresses, improve cutting efficiency, and exhibit an extended life span.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A cutting tool for use in a machine tool, comprising:
   a substantially cylindrical body having a cap disposed at a first end, a tool holder carrier disposed at a second end, and a tapered section disposed at the middle portion thereof, said cap including:
   a fixing groove disposed therein,
   a circular configured tip member welded to said fixing groove with silver, said tip member defining a pair of cutting edges disposed in a diagonal line with respect to each other, said pair of cutting edges being a composite unit and having a center point disposed at the center of said composite unit,
   said center point having a first inclined angle of about 35°–45° disposed at both sides with respect to said center point,
   a pair of chip guiding slots for receiving said tip member and guiding chips produced from the cutting operation, said pair of chip guiding slots disposed in a diagonal line with respect to each other,
   a pair of sharp edge points disposed at both end edges thereof, each of said pair of sharp edge points having a second inclined angle of about 6°–8° with respect to a vertical line thereof, and
   a pair of chip-outlet areas in the vicinity of said pair of chip guiding slots for delivering the chips therethrough,
   whereby the cutting tool can improve cutting efficiency, reduce cutting stresses, and exhibit an extended life span.

2. The cutting tool of claim 1, wherein said first inclined angle is 40°.

3. The cutting tool of claim 1, wherein said second inclined angle is 7°.

* * * * *